United States Patent
Bellenger

(10) Patent No.: US 10,161,456 B2
(45) Date of Patent: Dec. 25, 2018

(54) METHOD FOR EQUIPPING A FINE TUBE WITH AN END STOP THAT IS ADJUSTABLE BY SCREWING

(71) Applicant: SAFRAN LANDING SYSTEMS, Velizy Villacoublay (FR)

(72) Inventor: Vincent Bellenger, Velizy Villacoublay (FR)

(73) Assignee: SAFRAN LANDING SYSTEMS, Velizy Villacoublay (FR)

(*) Notice: Subject to any disclaimer, the term of this patent is extended or adjusted under 35 U.S.C. 154(b) by 0 days.

(21) Appl. No.: 15/712,774

(22) Filed: Sep. 22, 2017

(65) Prior Publication Data
US 2018/0087576 A1 Mar. 29, 2018

(30) Foreign Application Priority Data
Sep. 26, 2016 (FR) ..................... 16 59005

(51) Int. Cl.
*F16C 25/06* (2006.01)
*F16C 35/073* (2006.01)
(Continued)

(52) U.S. Cl.
CPC ............ *F16C 35/073* (2013.01); *B64C 25/36* (2013.01); *F16C 19/38* (2013.01); *F16C 25/06* (2013.01);
(Continued)

(58) Field of Classification Search
CPC ...... F16C 19/386; F16C 25/06; F16C 35/073; F16C 35/4304; F16C 2226/60;
(Continued)

(56) References Cited

U.S. PATENT DOCUMENTS

| 665,569 A | | 1/1901 | Little |
| 1,767,623 A | * | 6/1930 | Strong .................. F16C 35/073 |
| | | | 384/583 |

(Continued)

FOREIGN PATENT DOCUMENTS

| DE | 10-2007-059587 A1 | 6/2009 | |
| DE | 102012221232 A1 * | 5/2014 | ............ F16C 35/073 |
| GB | 06988 A | 7/1910 | |

OTHER PUBLICATIONS

French Preliminary Search Report of FR 1659005 dated Jun. 28, 2017.

*Primary Examiner* — Phillip A Johnson
(74) *Attorney, Agent, or Firm* — Sughrue Mion, PLLC

(57) ABSTRACT

The invention relates to a method for adapting a stop that is adjustable by screwing onto the extremity of a fine tube (1), including the following stages:
  slipping onto the extremity of the tube (5) a ferrule (10) that is threaded on its external surface and is immobilized on the extremity of the tube by means of a plurality of pins (8) engaged in orifices (7,9) facing towards the ferrule and the tube;
  screwing onto the ferrule a nut (14) having a first end face (15) acting as a stop in order to preload any element (4, 4) mounted on the tube in front of the ferrule, and a second opposing end face (18) containing forms (25) adapted for it to be driven in rotation by a tool, the nut covering the pins in service.

3 Claims, 2 Drawing Sheets

(51) Int. Cl.
  *F16C 19/38*  (2006.01)
  *F16C 25/08*  (2006.01)
  *F16C 33/58*  (2006.01)
  *B64C 25/36*  (2006.01)
  *F16C 19/36*  (2006.01)
  *F16C 19/54*  (2006.01)

(52) U.S. Cl.
  CPC .......... *F16C 25/083* (2013.01); *F16C 33/586* (2013.01); *F16C 19/364* (2013.01); *F16C 19/548* (2013.01); *F16C 2226/60* (2013.01); *F16C 2326/02* (2013.01); *F16C 2326/43* (2013.01)

(58) Field of Classification Search
  CPC .............. F16C 2229/00; F16C 2326/02; F16C 2326/43; F16D 65/46; F16D 65/56; F16D 65/66; B64C 25/26
  See application file for complete search history.

(56) References Cited

U.S. PATENT DOCUMENTS

| | | | |
|---|---|---|---|
| 2,195,795 A * | 4/1940 | Baker | F16C 19/364 |
| | | | 384/564 |
| 5,328,275 A | 7/1994 | Winn et al. | |
| 5,908,249 A * | 6/1999 | Nisley | F16C 19/386 |
| | | | 277/351 |
| 6,003,641 A | 12/1999 | Boehringer et al. | |
| 2016/0031259 A1 | 2/2016 | Champion | |

\* cited by examiner

METHOD FOR EQUIPPING A FINE TUBE WITH AN END STOP THAT IS ADJUSTABLE BY SCREWING

The invention relates to a method for equipping a fine tube with an end stop that is adjustable by screwing.

BACKGROUND TO THE INVENTION

In the field of aircraft landing gear, the wheels are generally equipped with taper roller bearings which are engaged on an axle of the landing gear and are preloaded by a nut at the extremity of the axle which bears against one of the bearings, the other bearing pushing against a stop of the axle. The bearings are not generally mounted directly on the axle, but a liner is interposed between the axle and the bearings notably in order to protect the axle from the flows of heat released by the brake discs that are accommodated in the wheel. This liner is routinely referred to as an axle protector.

Recently, consideration has been given to the possibility of preloading the bearings directly on the axle protector, which would be provided in the circumstance in which a stop is present at one of its extremities and a preloading nut is present at the other of its extremities, the assembly then being slipped as it is onto the axle and being immobilized axially by means of the axle nut.

However, the axle protector in question is in the form of a tube of small thickness, and the passage of the bearings requires the height of the threads not to exceed the seat on which the bearing closest to the thread will rest, which leaves very little thickness available for the production of the thread. The production of a suchlike thread at the extremity of such a fine tube is accordingly not readily feasible, notably for reasons of fatigue resistance.

OBJECT OF THE INVENTION

The invention proposes a method for equipping a fine tube with an end stop that is adjustable by screwing, but without having to thread the tube itself.

SUMMARY OF THE INVENTION

With a view to achieving this aim, the inventive method includes the following stages:
- slipping onto the extremity of the tube a ferrule that is threaded on its external surface and is immobilized on the extremity of the tube by means of a plurality of pins engaged in orifices facing towards the ferrule and the tube;
- screwing onto the ferrule a nut having a first end face acting as a stop in order to preload any element mounted on the tube in front of the ferrule, and a second opposing end face containing forms adapted for it to be driven in rotation by a tool, the nut covering the pins in service.

The elements, such as the bearings of the wheels, may thus be slipped onto the tube without any obstacle obstructing their progress. Once in place against the extremity forming a stop of the tube, the ferrule and then the nut are re-applied. The latter is tightened by means of a tool cooperating with the second face of the nut turned towards the operator. It should be noted that the first face must necessarily extend beyond the ferrule in order to come into contact with the bearings, such that the nut covers the pins and therefore prevents them from exiting from the orifices in which they are engaged. The ferrule may be provided with sufficient thickness for it to be able to receive a thread on its external face without the risk of failure under fatigue. This solution is diametrically highly compact and may thus be used in environments with strict space requirements.

According to one particular embodiment, the method includes the stage of preventing the nut from rotating on the ferrule by re-applying to the second face of the nut, once the latter is in place, a ring including at least one finger intended to engage in a castellation disposed on an extremity of the ferrule. The ring is fixed to the nut by any means, notably screws.

BRIEF DESCRIPTION OF THE DRAWINGS

The invention will be more readily appreciated from a perusal of the following description of an embodiment of the invention with reference to the figures in the accompanying drawings, in which.

DETAILED DESCRIPTION OF THE INVENTION

Figure 1:
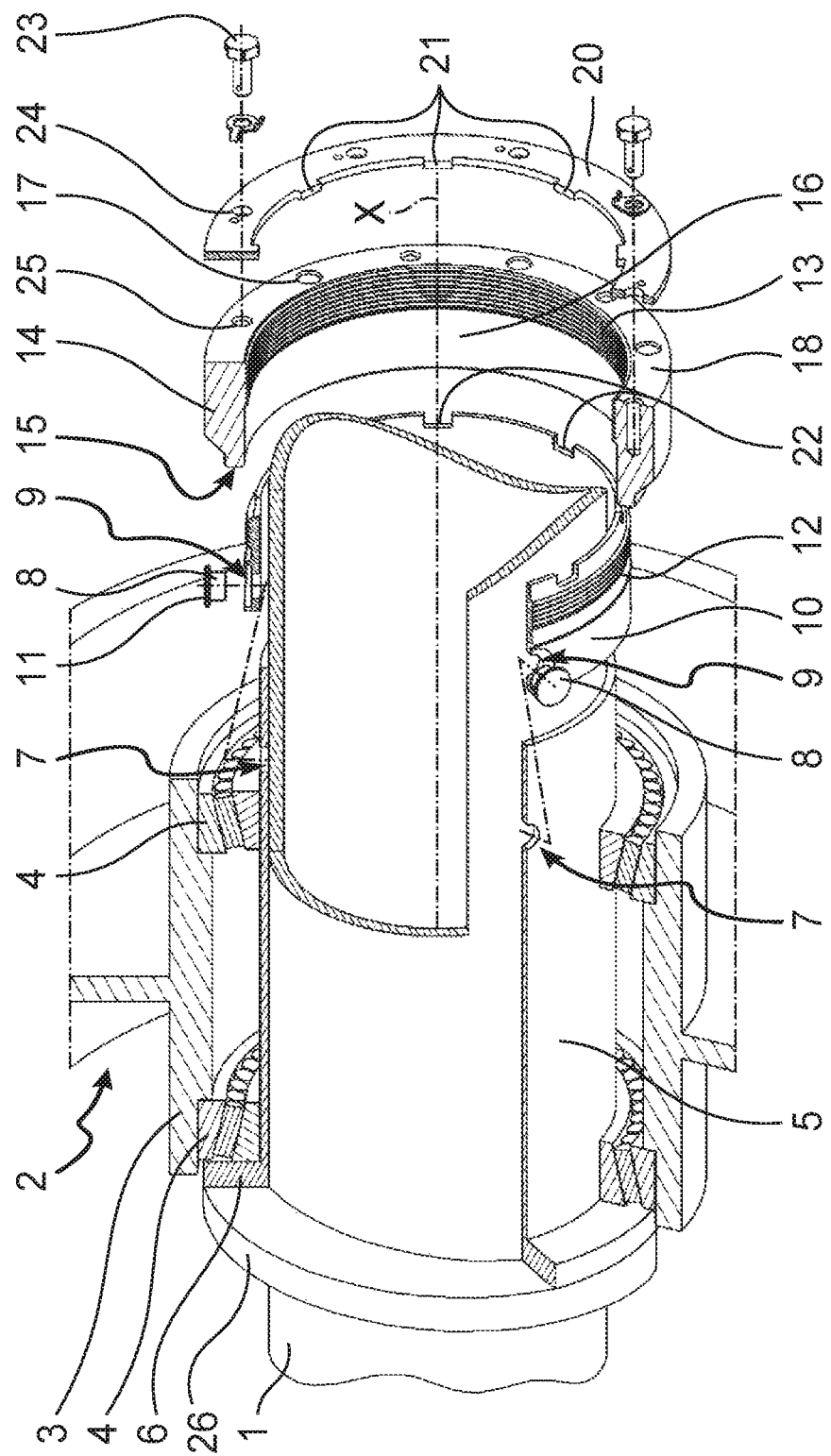
FIG. 1 is a partially sectioned view of the bottom of an aircraft landing gear, depicting an axle on which a wheel will be installed, with the interposition of an axle protector equipped according to the invention with an adjustable stop.
Figure 2:
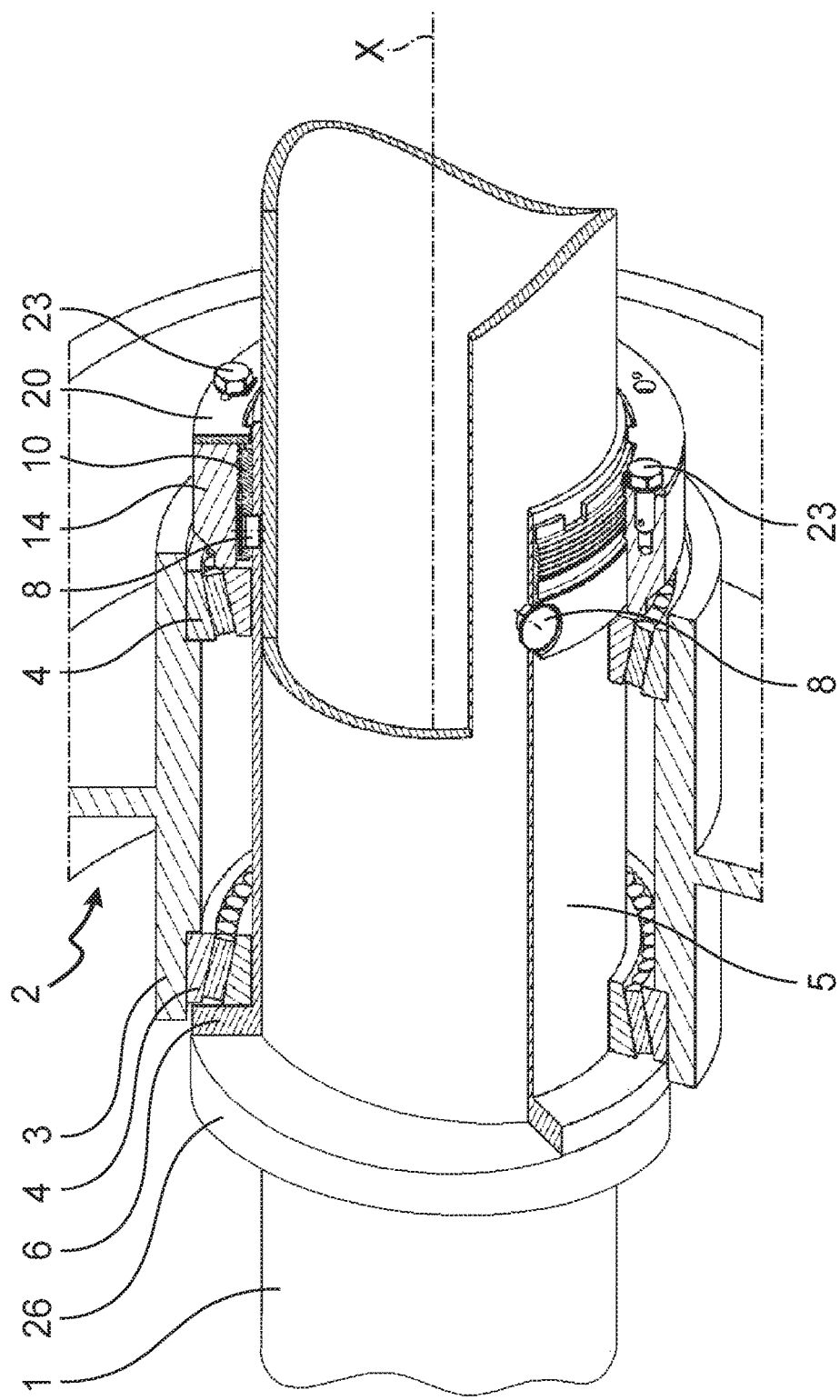
FIG. 2 is a view similar to that in FIG. 1, depicting the finished installation.

The invention is described in detail here with reference to the figures illustrating the application of the inventive method to the installation of a wheel on an axle of an aircraft landing gear, although it may be used for other applications. A wheel 2, of which the hub 3 which carries two tapered roller bearings 4 can be seen, is applied here to an axle 1. The bearings are slipped onto the axle 1 in order to rotate about an axis of rotation X with the interposition of an axle protector 5, which is present in the form of a fine tube equipped at its extremity with a fixed stop 6, against which one of the bearings 4 of the wheel abuts. The other extremity of the axle protector includes transcurrent orifices 7, which extend over a circumference (two partially sectioned orifices are visible in FIG. 1).

The orifices 7 are intended to receive pins 8, which are engaged in orifices 9 of a ferrule 10 which is slipped onto the extremity of the axle protector 5. Of course, the orifices 9 of the ferrule 10 face towards the orifices 7 of the axle protector 5. The pins 8 prevent the ferrule 9 from rotating and hold it axially on the axle protector. Here, the pins 8 have a head 11 which engages in a recess in the orifices 9. The ferrule 10 includes on its external face a thread 12 intended to cooperate with a thread 13 of a nut 14. The nut 14 includes an end face 15 (or stop face) which pushes against the facing bearing 4 and thus forms an adjustable stop, permitting the adjustment of the preloading of the bearings 4 between the fixed stop 6 and the nut 14. The end face 15 extends to the extremity of a skirt 16 of the nut 14 which covers the pins 8, so that the latter are unable to exit from their housings, either via the exterior due to the presence of the nut 14, or towards the interior because of their heads 11. The nut 14 is operated by means of a tool (not depicted here) including fingers engaging in indentations 17 which are disposed on an end face 18 (or operating face) turned towards the operator. A locking washer 20, which is pressed against the operating face 18, is used to secure the nut 14. The washer 20 includes pins 21 which engage in slots 22 disposed in the extremity of the axle protector 5. The washer 20 is then secured to the nut 14 by means of screws 23 which are engaged in orifices 24 in the locking washer 20 and which are screwed into threads 25 produced on the operating face 18 in axes parallel to the axis of rotation X. Of course, the nut 14 should be tightened sufficiently to cause the orifices 24 in the washer 20 to come into alignment with the threads 25 of the nut 14.

The axial locking of the assembly on the axle 1 is achieved by means of, on the one hand, a fixed stop 26 of the axle on which the extremity in the form of a fixed stop 6 of the axle protector 5 is supported, and on the other hand by an axle nut (not depicted here) screwed onto a threaded extremity of the axle in order to lock the protector axially on the axle.

The inventive method includes a number of advantages. It permits the adaptation of a stop that is adjustable by screwing, while leaving free passage for the bearings on the fine tube. The thread is produced on the ferrule, which is re-applied after the elements to be tightened (in this case the bearings) have passed, and it is possible to impart to the ferrule the necessary thickness to receive a thread capable of resisting, notably in fatigue, the load cycles experienced by the wheel and the axle. The assembly, when re-applied to the extremity of the fine tube (ferrule, nut), is radially very compact and is axially accessible.

The invention is not limited to what is described above, but in fact includes any variant falling within the framework defined by the claims.

In particular, the pins can be positioned on the ferrule before the latter is slipped onto the axle, for example by being retained on the ferrule by an elastic ligament extending around the ferrule. The elastic ligament permits their separation during the engagement of the ferrule on the fine tube protector, while preventing the pins from falling out during installation and by pushing the pins automatically into the orifices of the fine tube when they are facing one another.

The invention claimed is:

1. A method for adapting a stop that is adjustable by screwing onto an extremity of a tube, including the following stages:
   slipping a ferrule onto the extremity of the tube, wherein the ferrule is threaded on an external surface and is immobilized on the extremity of the tube by means of a plurality of pins engaged in orifices facing towards the ferrule and the tube;
   screwing onto the ferrule a nut having a first end face acting as a stop in order to preload any element mounted on the tube in front of the ferrule, and a second opposing end face containing forms to be operated by means of a tool cooperating with the forms, the nut covering the pins in service.

2. The method according to claim 1, in which the pins include a head received in a recess in the orifice of the ferrule.

3. The method according to claim 1, in which the nut is prevented from rotating by means of a locking washer fixed on the second face of the nut and including pins engaging in slots in the extremity of the tube.

* * * * *